Jan. 27, 1970  E. T. CZICHOS  3,492,017
AMUSEMENT VEHICLE
Filed Jan. 19, 1968  3 Sheets-Sheet 1

Edward T. Czichos
INVENTOR.

BY *Clarence A. O'Brien*
*and Harvey B. Jacobson*
Attorneys

Jan. 27, 1970  E. T. CZICHOS  3,492,017
AMUSEMENT VEHICLE
Filed Jan. 19, 1968  3 Sheets-Sheet 2
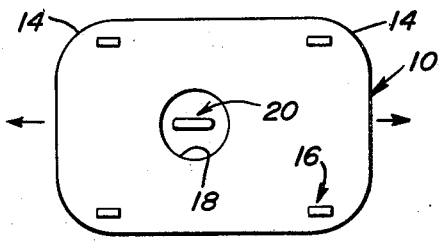
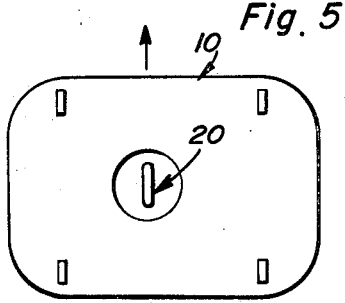
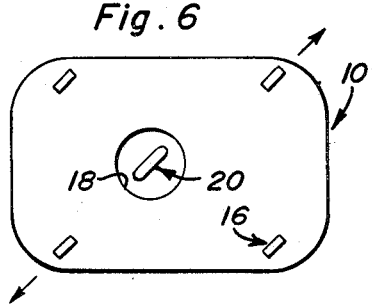
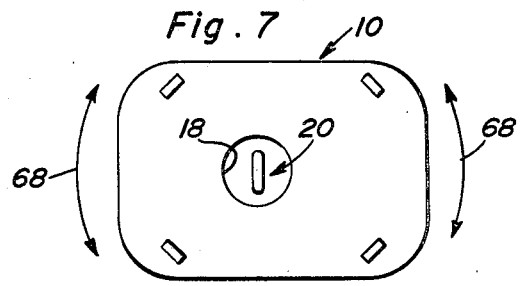
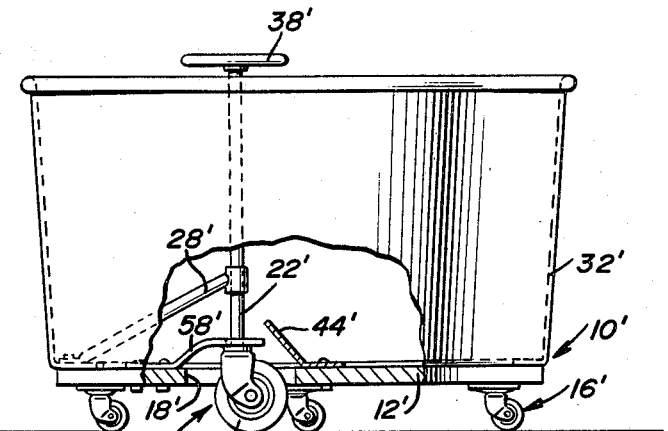
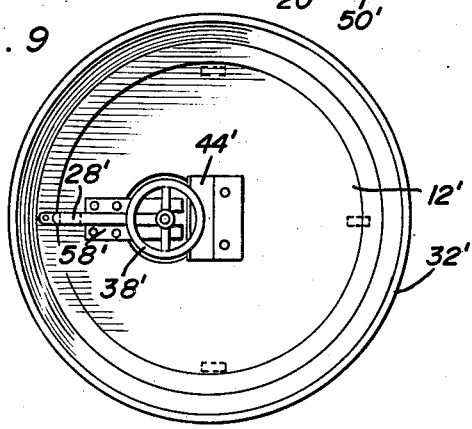
Edward T. Czichos
INVENTOR.

Jan. 27, 1970  E. T. CZICHOS  3,492,017
AMUSEMENT VEHICLE
Filed Jan. 19, 1968  3 Sheets-Sheet 3

Edward T. Czichos
INVENTOR.

United States Patent Office 3,492,017
Patented Jan. 27, 1970

3,492,017
AMUSEMENT VEHICLE
Edward T. Czichos, 2051 Cincinnati St.,
San Antonio, Tex. 78228
Filed Jan. 19, 1968, Ser. No. 699,137
Int. Cl. B62b 3/00; A63g 1/00
U.S. Cl. 280—87.02                              17 Claims

ABSTRACT OF THE DISCLOSURE

A platform including at least three depending ground-engaging support wheels generally equally spaced about the periphery of the platform and further including a dependingly supported dirigible and steerable control wheel assembly generally centrally located in the area of the platform bound by the plurality of ground-engaging support wheels of the platform, at least one of the depending support wheels being of the caster wheel type with the remainder of the support wheels being adapted for rolling movement in directions generally paralleling the direction of rolling movement of the caster-type support wheel.

---

The amusement vehicle of the instant invention has been designed to provide a vehicle in which one or more children may ride and the vehicle may be of the coasting vehicle type without a source of self-propulsion or the steerable control wheel thereof may be driven from a suitable power source.

Although it is possible to construct the vehicle of the instant invention by utilizing three caster-type ground-engaging support wheels disposed about a center steerable control wheel, in order to provide greater lateral stability for the vehicle it has been found that it is more desirable to utilize at least four ground-engaging support wheels disposed about the central steerable control wheel. In addition, although the support wheels of the various forms of amusement vehicle illustrated and described hereinafter include support wheels which are all of the caster wheel type, it is possible that the support wheels may be arranged in front and rear opposite side pairs of wheels with either the front pair of wheels or the rear pair of wheels mounted for rotation about a fixed transverse axis and only the other pair of support wheels being of the caster wheel type.

The main object of this invention is to provide an amusement vehicle capable of supporting one or more children and which may be of the self-propelled type or without power so as to be of the coaster vehicle type.

Another object of this invention is to provide an amusement vehicle including structural features thereof capable of rendering a controlled but different ride to its occupants.

Still another object of this invention is to provide an amusement vehicle that may be readily constructed of various sizes merely by changing the size of the platform and the occupant enclosing body portion thereof.

A final object of this invention to be specifically enumerated herein is to provide an amusement vehicle in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 4–7 are bottom plan views of the vehicle illustrated in FIGURES 1–3 with the ground-engaging support wheels and the control wheel thereof in different positions in order to enable the vehicle to move in different directions;

FIGURE 8 is a side elevational view of a modified form of vehicle constructed in accordance with the present invention;

FIGURE 9 is a top plan view of the vehicle illustrated in FIGURE 8;

Figure 1:
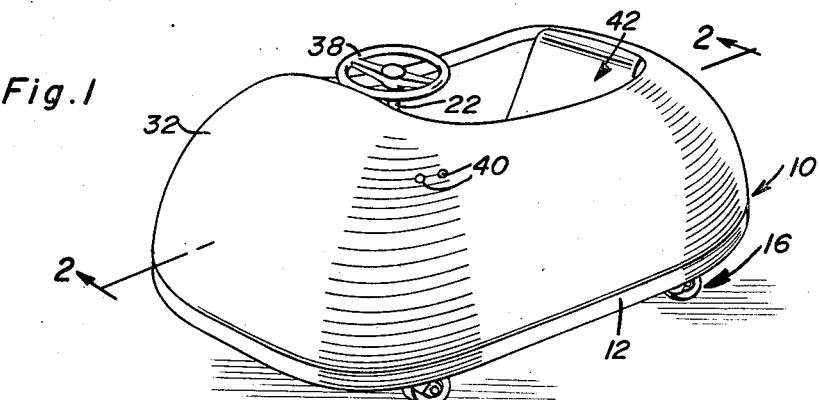
FIGURE 1 is a perspective view of the amusement vehicle.

Referring now more specifically to the drawings, the numeral 10 generally designates the first form of the invention which includes a generally rectangular platform 12 including rounded corner portions 14 and four dependingly supported ground-engaging caster wheel support assemblies, generally referred to by the reference numerals 16 carried by the four corner portions 14 of the platform 12.

The caster wheel assemblies 16 are generally equally spaced about the platform 12 and the latter is provided with a generally centrally disposed opening 18 in which a steerable control wheel assembly generally referred to by the reference numeral 20 is disposed. The control wheel assembly is carried by the lower end portion of an upright steering shaft 22 journaled through and slidably supported from journal portions 24 and 26 supported from brace structures 28 and 30. The brace structure 30 extends transversely across the shell-type body 32 secured to the upper surface of the platform 12 by means of suitable fasteners 34.

The body 32 is generally inverted cup-shaped in configuration and includes a cockpit opening 36 in its upper portion upwardly through which the steering shaft 22 projects. The upper end of the steering shaft 22 has a steering wheel 38 mounted thereon and it may be seen from FIGURES 2 and 3 of the drawings that the brace structure 30 has its opposite ends secured to the shell-type body 32 by means of suitable fasteners 40 and that the brace structure 28 is inclined downwardly and forwardly from the journal portion 24 and is secured to the platform 12 by means of one of the fasteners 34 also utilized to secure the shell-type body 32 to the platform 12.

A seat structure referred to in general by the reference numeral 42 is provided within the cockpit defined by the opening 36 and the seat structure 42 is disposed rearward of the shaft 22 and the steering wheel 38.

An inclined panel 44 of resilient metal includes a generally horizontal flange portion 46 on its rearwardly and downwardly inclined end which is secured to the platform 12 by means of fasteners 48. The panel 44 is inclined forwardly and upwardly away from the flange portion 46 and overlies the wheel 50 of the control wheel assembly 20 so as to protect the feet of the occupant of the vehicle 10 from contacting the wheel 50. Further, if the panel 44 is forwardly and downwardly depressed at its forward upwardly inclined end by the occupant of the vehicle 10 when the wheel 50 is disposed in its rearmost position illustrated in FIGURE 2, the panel 44 may be forced to bear down upon and frictionally engage the wheel 50 for braking purposes.

Figure 2:
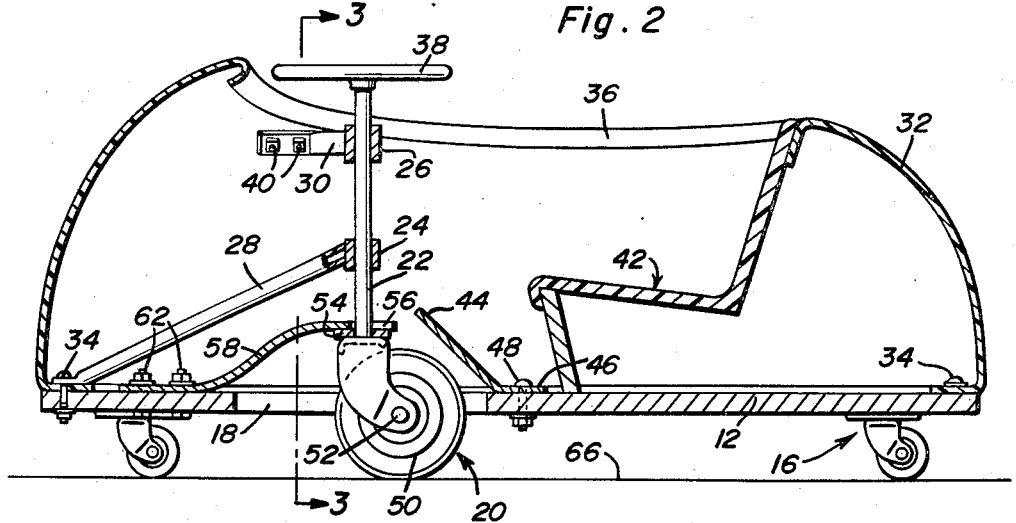
FIGURE 2 is an enlarged longitudinal vertical sectional view taken substantially upon the plane indicated by the section line 2—2 of FIGURE 1.
Figure 3:
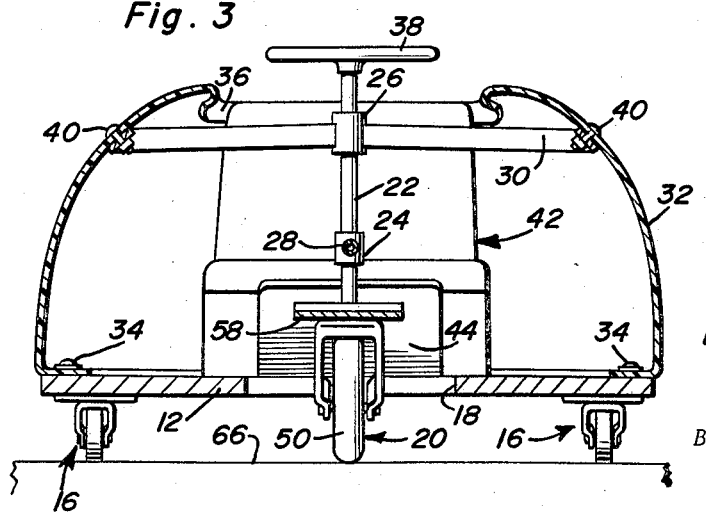
FIGURE 3 is a vertical transverse sectional view taken substantially upon the plane indicated by the section line 3—3 of FIGURE 2.

From FIGURE 2 of the drawings it may be seen that the control wheel assembly 20 has the axle pin 52 thereof spaced transversely of the longitudinal centerline of the shaft 22 and therefore it may be seen that the control wheel assembly 20 will always have a tendency to roll in the direction in which it is heading. By this construction the user of the vehicle 10 may control forward movement of the vehicle 10 in a more precise manner. Further, the control wheel assembly 20 will tend to continue to point in the direction in which the wheel 50 is rolling even though the platform 12 of the vehicle 10 is rotating about the shaft 22.

The shaft 22 has a thrust washer 54 disposed thereabout immediately adjacent the control wheel assembly 20 and the portion of the shaft 22 disposed above the thrust washer 54 is received slidingly and rotatably through a slot 56 formed in one end of a resilient spring arm 58 whose other end 60 is secured to the platform 12 by means of suitable fasteners 62 secured through apertures 64 formed in the spring arm 58 and also through the platform 12.

The slotted end of the spring arm 58 presses downwardly on the thrust washer 54 so as to urge the wheel 50 of the control wheel assembly 20 into contact with the ground 66 upon which the caster wheel assemblies 16 are also resting. In this manner, the wheel 50 is operable to control the direction of movement of the vehicle 10 over the ground 66 although the vehicle 10 is capable of rotating about the support shaft 22 in the manner designated by the arrows 68 in FIGURE 7 of the drawings.

From FIGURES 4, 5, 6 and 7 it may be seen that the vehicle 10 may proceed in a longitudinal direction, in a transverse direction, in an oblique direction and, as above set forth, in any direction while the platform 12 rotates about the shaft 22.

If it is desired, suitable stops may be provided to limit the steering movement of the control wheel assembly 20 to positions rotated 90° on either side of the position of the control wheel assembly illustrated in FIGURE 2 of the drawings and the rear caster wheel assemblies 16 of the vehicle 10 may be fixed in position with the wheels thereof journaled about stationary transverse axes. Of course, such non-dirigible mounting of the rear wheels of the vehicle 10 will prevent the movements of the vehicle illustrated in FIGURES 5, 6 and 7 of the drawings although the vehicle 10 may still be controlled by the control wheel assembly 20 in the manner in which a conventional automobile is controlled.

With attention now invited more specifically to FIGURES 8 and 9 of the drawings there may be seen a modified form of vehicle which is quite similar to the vehicle 10 and which has the component parts thereof similar to corresponding parts of the vehicle 10 designated by corresponding prime numerals. Accordingly, it may be seen that the vehicle 10' of FIGURES 8 and 9 may enjoy all of the movements of the vehicle 10 illustrated in FIGURES 4, 5, 6 and 7. However, the wheel 50' of the control wheel assembly 20' is somewhat smaller in diameter in relation to the wheels of the caster wheel assemblies 16' and the protective panel 44' may not be depressed downward into engagement with the wheel 50' and may therefore not function as a brake. Further, the body 32' of the vehicle 10' is generally tub-shaped in configuration and may therefore support a plurality of children standing within at least the rear portion of the body 32'.

Figure 10:
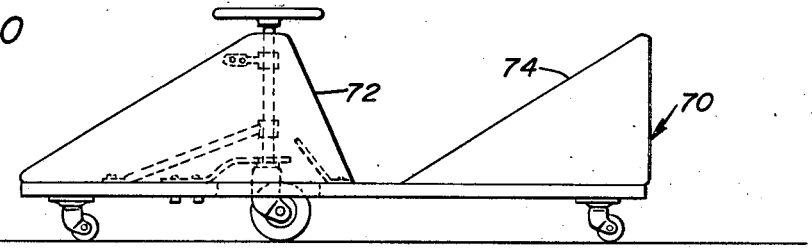
FIGURE 10 is a side elevational view of a third form of vehicle constructed in accordance with the present invention.
Figure 11:
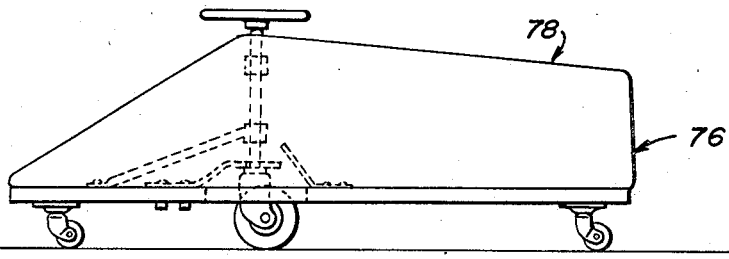
FIGURE 11 is a side elevational view of a fourth vehicle.

With attention now invited to FIGURE 10 of the drawings there may be seen a further vehicle referred to in general by the reference numeral 70 and which is substantially identical to the vehicle 10 except that it is provided with a two-piece body including a rearwardly and downwardly opening pyramidal front section 72 and a rear section 74. In addition, the vehicle generally referred to by the reference numeral 76 illustrated in FIGURE 11 of the drawings is also to be considered as substantially identical to the vehicle 10 except that the vehicle 76 includes a one-piece body 78 which is different from the body 10.

Figure 12:
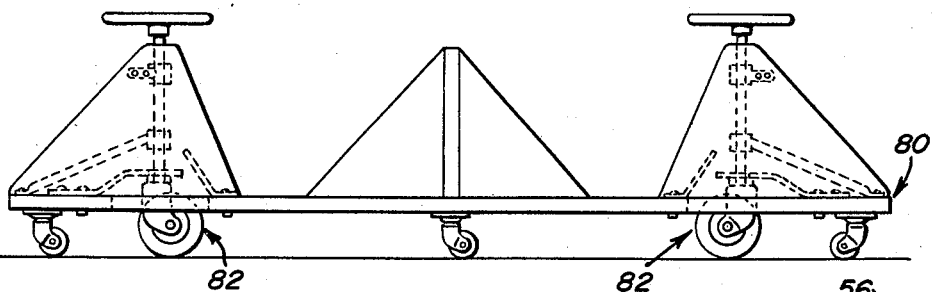
FIGURE 12 is a side elevational view of a fifth vehicle including steerable control wheels at opposite ends thereof.

With attention now invited to FIGURE 12 of the drawings there may be seen a fifth form of vehicle constructed in accordance with the present invention generally referred to by the reference numeral 80 and which might readily be considered as a composite structure including a pair of the vehicles 70 secured together in rear end abutting relation and with the rear caster wheel assemblies of only one of the vehicles 70 retained. Thus, the vehicle 80 comprises a double-ended vehicle with two steerable control wheel assemblies generally referred to by the reference numerals 82.

Figure 13:
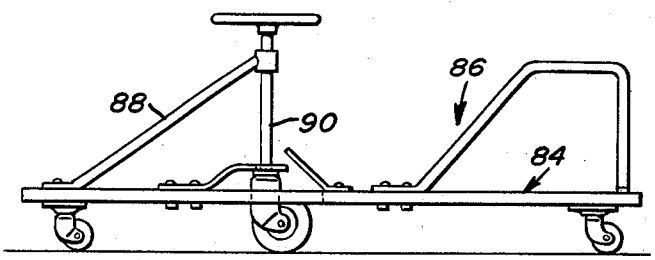
FIGURE 13 is a side elevational view of a sixth vehicle constructed in accordance with the present invention.
Figure 14:
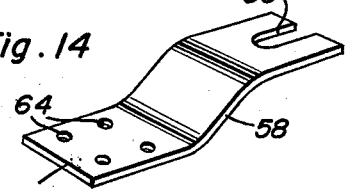
FIGURE 14 is an enlarged perspective view of the spring-type guide bracket for the lower end portion of the steerable control wheel assembly utilized in each of the disclosed forms of the invention.

Referring finally to FIGURE 13, there may be seen a sixth form of vehicle generally referred to by the reference numeral 84 and which comprises a substantial duplicate of the vehicle 10 except that it is provided only with a skeleton body referred to in general by the reference numeral 86 and a single inclined brace structure 88 for the steering shaft 90.

In operation, one or more children may ride in the vehicle and one of the riders may control the control wheel assembly by its steering wheel. Of course, when the vehicle 80 is used, either one or both of the control wheel assemblies 82 may be steered. Further, in each form of the invention disclosed, the support arm thereof corresponding to the support arm 58 presses downwardly on the associated control wheel assembly with sufficient force to at least partially support the weight of the vehicle from the support wheel assembly and thereby enable the vehicle to be steered by the control wheel assembly.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An amusement vehicle comprising a base, at least three dependingly supported support wheels journaled from said base at points spaced generally evenly about a predetermined area of said base, a control wheel assembly dependingly supported from said base within said area and oscillatable about an upstanding axis, control means for said control wheel assembly for oscillating the latter about said axis, said control wheel assembly being supported from said base for vertical shifting relative thereto between upper and lower positions with the lower periphery of said control wheel spaced above and below the lower peripheral portions of said plurality of support wheels, respectively, and means operatively connected between said base and said control wheel assembly yieldingly urging the latter toward said lower position and thereby transferring at least a portion of the weight of said vehicle, exclusive of said control wheel assembly, to the latter, at least one of said support wheels comprising a caster wheel assembly for free steering oscillation with said control wheel assembly.

2. The combination of claim 1 wherein said amusement vehicle includes an operator's seat supported from said base.

3. The combination of claim 2 wherein said vehicle includes an operator enclosing body for said seat and the operator disposed thereon.

4. The combination of claim 1 wherein said vehicle includes four support wheels spaced about said control wheel assembly, at least two of said support wheels comprising caster wheel assemblies.

5. The combination of claim 1 wherein said support wheels all comprise caster wheel assemblies.

6. The combination of claim 1 wherein said vehicle includes a second dependingly supported control wheel assembly, said area being elongated and said control wheel assemblies being disposed in the opposite end portions of said areas.

7. The combination of claim 6 wherein said vehicle includes a pair of said support wheels at opposite end extremities of said area and a pair of said support wheels at opposite side extremities of said area generally centrally intermediate the opposite nends of said extremities.

8. The combination of claim 1 wherein said vehicle includes an operator enclosing body in which said control means is disposed.

9. The combination of claim 8 wherein said body is in the form of an upwardly opening tub in which said control means is generally centrally disposed.

10. The combination of claim 1 wherein said control wheel assembly is supported from the lower end of an upstanding control shaft supported from said base for angular and longitudinal oscillation relative to said base, the upper end of said shaft including a handgrip defining member comprising said control means.

11. The combination of claim 10 wherein said handgrip defining member comprises a horizontally disposed steering wheel mounted on the upper end of said shaft for rotation therewith.

12. The combination of claim 1 wherein said base comprises a panel-like platform from whose undersurface said support wheels are supported.

13. The combination of claim 12 wherein said platform includes an opening in said area upwardly through which said control wheel assembly projects.

14. The combination of claim 1 wherein said control wheel assembly is supported from the lower end of an upstanding control shaft supported from said base for angular and longitudinal oscillation relative to said base, the upper end of said shaft including a handgrip defining member comprising said control means, said shaft having an upwardly facing abutment surface on its lower end, said means yieldingly urging said control wheel assembly toward said lower position comprising a spring arm member secured to said base at one end and notched at its other end, said shaft being rotatably received through said notch with the undersurface of said other end of said spring arm disposed about said notch bearing down upon said abutment surface.

15. The combination of claim 14 wherein said handgrip defining member comprises a horizontally disposed steering wheel mounted on the upper end of said shaft for rotation therewith.

16. The combination of claim 15 wherein said base comprises a panel-like platform from whose undersurface said support wheels are supported.

17. The combination of claim 16 wherein said platform includes an opening in said area upwardly through which said control wheel assembly projects.

References Cited

UNITED STATES PATENTS

| | | | |
|---|---|---|---|
| 1,373,108 | 3/1921 | Stoehrer | 180—2 |
| 1,499,672 | 7/1924 | Lezert | 272—35 |
| 1,669,104 | 5/1928 | Stock | 180—2 |
| 1,839,981 | 1/1932 | Markey | 180—2 |
| 2,988,370 | 6/1961 | Bertram | 280—87.02 |
| 3,197,227 | 7/1965 | Anselmo | 280—87.01 |
| 3,438,642 | 4/1969 | Kite et al. | 280—8 |

FOREIGN PATENTS 733,852   7/1932   France.

LEO FRIAGLIA, Primary Examiner

U.S. Cl. X.R.
180—2; 272—35